United States Patent Office 3,644,542
Patented Feb. 22, 1972

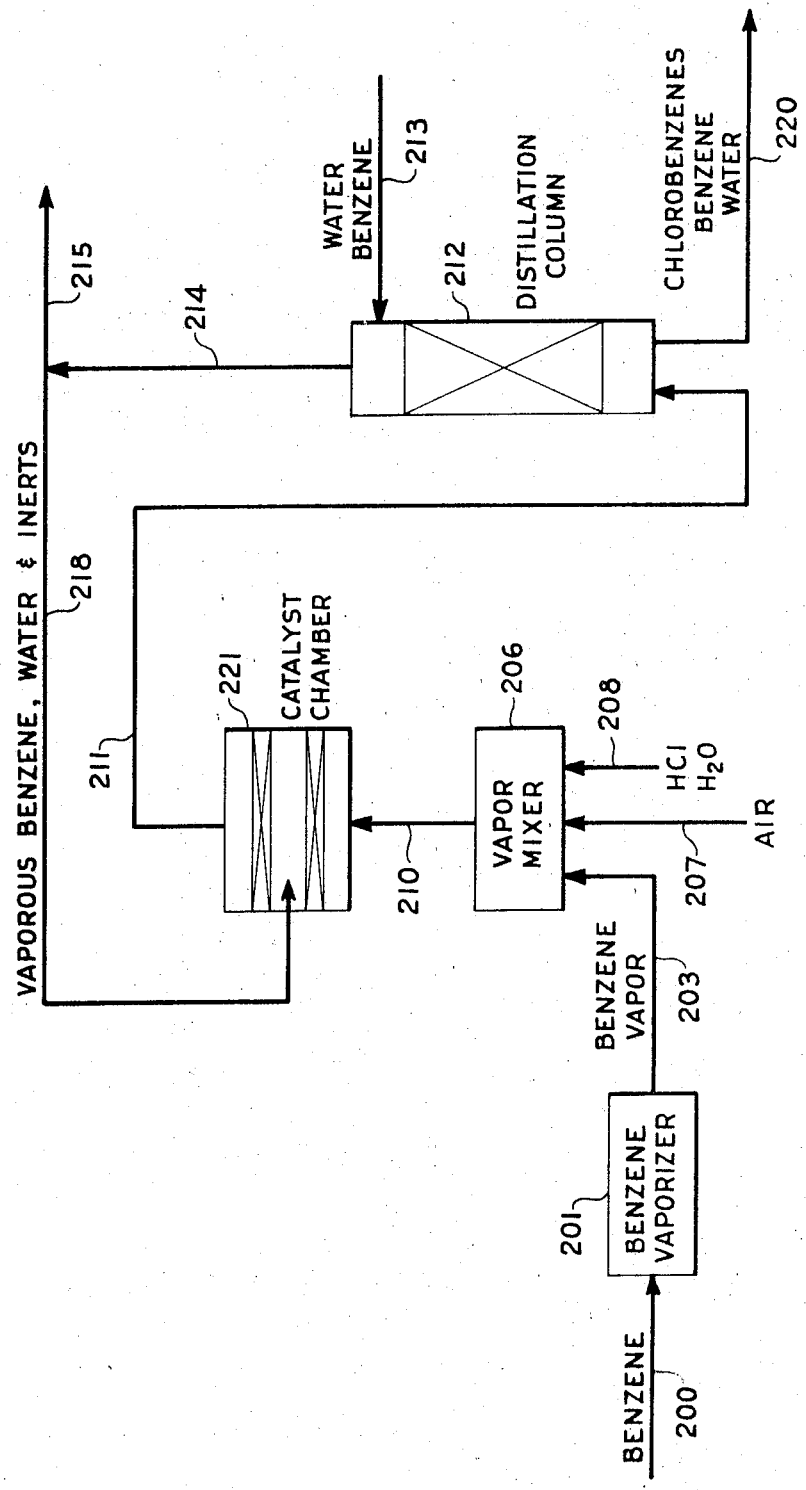

3,644,542
BENZENE OXYCHLORINATION
Walter H. Prahl, Karlsruhe, Germany, Jay P. Eggert, Bellefonte, Ky., and Sol J. Lederman, Kenmore, Eric H. Scremin, Niagara Falls, and Albert C. Ulrich, Buffalo, N.Y., assignors to Hooker Chemical Corporation, Niagara Falls, N.Y.
Continuation-in-part of application Ser. No. 292,460, July 2, 1963, which is a continuation-in-part of applications Ser. No. 133,565, Ser. No. 133,801, and Ser. No. 133,802, all Aug. 25, 1961. This application June 17, 1969, Ser. No. 833,822
The portion of the term of the patent subsequent to June 18, 1985, has been disclaimed
Int. Cl. C07c 25/06
U.S. Cl. 260—650 R            6 Claims

ABSTRACT OF THE DISCLOSURE

Monochlorobenzene is produced in higher yield with lower investment and operation costs by a continuous benzene oxychlorination process which comprises: (1) passing hydrogen chloride, an oxygen-containing gas and benzene, said benzene being in excess of that theoretically required to react with all of the hydrogen chloride; through at least 2 packed catalytic zones in series, each of said zones being adapted to cause only a partial conversion of the reactants to monochlorobenzene and to cause an increase in temperature of the reaction gas stream, (2) substantially lowering the temperature of the reaction gas stream as it passses from one catalytic zone to the next adjacent catalytic zone by injecting coolant selected from the group consisting of benzene, water, inerts, and mixtures thereof, directly into the reaction gas stream as it passes between each of said zones in an amount sufficient to lower the temperature of the reaction gas to the desired extent, and (3) recovering the monochlorobenzene from the reaction vapors from the final catalytic zone.

---

This is a continution-in-part of Ser. No. 292,460, filed July 2, 1963 and now abandoned, which is a continuation-in-part of Ser. No. 133,565, Ser. No. 133,801, and Ser. No. 133,803, each filed on Aug. 25, 1961. Ser. No. 133,565 and Ser. No. 133,801 are now abandoned. Ser. No. 133,803 is abandoned and the subject matter continued in Ser. No. 510,078, filed Nov. 26, 1965, which issued as U.S. 3,389,186 on June 18, 1968.

This invention relates to the vapor phase chlorination of benzene, with hydrogen chloride and an oxygen-containing gas over a catalyst, and more specifically to a method of controlling the temperature of this exothermic reaction.

The chlorination of benzene by means of hydrochloric acid and an oxygen-containing gas is represented theoretically by the equation:

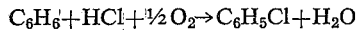

$$C_6H_6 + HCl + \tfrac{1}{2} O_2 \rightarrow C_6H_5Cl + H_2O$$

The reaction is carried out over catalysts such as those described in U.S. Pat. 1,963,761. It is a strongly exothermic reaction. If the heat of reaction were not carried off, the temperature of the reaction mixture would quickly rise to a level at which the desired chlorination reaction would be more and more replaced by a straight oxidation of the benzene to carbon dioxide. If not carefully controlled, the HCl in the presence of water can cause severely corrosive conditions. In fact, use of the oxychlorination method to produce monochlorobenzene, and especially as a route to phenol, has been hindered in part by the reputation this process has for corrosiveness.

In order to avoid this undesirable tendency toward lower yields and undesired by-products, it is necessary to control the temperature of the reaction mixture within defined limits, preferably between about 150 and 350 degrees centigrade, by eliminating the heat of reaction.

Several methods for controlling the temperature within this range are available. For instance, the catalysts have been placed inside of pipes or other hollow devices and surrounded by liquid or gaseous cooling media.

With increasing conversion of benzene to monochlorobenzene, increasing quantities of di- and more highly chlorinated benzenes are formed. For this reason, it is practically necessary to keep the conversions down to around ten to twenty percent, per pass, or in other words, to pass through the catalyst an excess of benzene vapor of five to ten times the quantity which is to be reacted. In the conventional method the whole quantity of benzene is first vaporized with a concurrent consumption of steam, then passed through the catalyst together with appropriate quantities of hydrogen chloride, water and air, and then the condensible components of the reaction mixture are condensed with a concurrent consumption of cooling water. The excess benzene is separated, for instance, by distillation, and returned to the vaporization step for re-use.

The present invention provides a method which is not only more economical in initial investment cost and in operating cost, but in addition, results in an improved controllability, better yield of desired product, and other advantages.

An object of this invention then is to provide a method of removing the heat of reaction in the vapor phase chlorination of benzene with hydrochloric acid and air over a catalyst in a more efficient way than the method presently used.

Another object is to provide an apparatus which has a lower initial cost and is more economical to operate than the method presently used.

A further object is to improve the technical operation of this reaction by increasing its safety, controllability, reducing its corrosiveness, and other technical aspects.

Still another object is to improve the yield of desired products and lower the undesired production of by-products.

Another object is to provide a more economical method of producing monochlorobenzene by saving some of the heat normally required to vaporize the excess benzene and some of the cooling water normally required to condense it.

Another object is to provide a more economical method of producing monochlorobenzene by permitting the production of a given quantity of monochlorobenzene in smaller equipment.

Still another object is to improve the thermal characteristics of the reaction and thereby reduce the tendency of the reaction to lead to complete combustion of some benzene to carbon dioxide.

Other objects of the invention will become apparent in the course of the description.

These objects can be further achieved by the following improvements: (1) division of the catalytic zone into a number of smaller individual catalytic zones through which the reaction gases pass in series, and (2) cooling (i.e., actually lowering the temperature) of the resulting reaction gas stream passing from one zone to the next adjacent zone, by injecting directly into the reaction gas stream between each zone a coolant selected from the group consisting of benzene, water, inerts and mixtures thereof, such as benzene, or a vaporous mixture consisting essentially of benzene, water and inerts, such as that from the overheads of the oxychlorinator effluent distillation column or condenser formed in accordance with the above process described in U.S. 3,389,186. This stream contains unreactive materials such as nitrogen, carbon dioxide and water, but they are present in sufficiently low proportions or amounts so that they do not unduly dilute the reactants nor do they cause an unmanageable increase in load of foreign materials to be purged from the system.

Thus, the objects of the present invention may be achieved as one species of this invention by introducing the reacted mixture from the catalyst chamber with substantially no cooling into the bottom portion of a distillation zone or column, into the top portion of which benzene and water are fed, thereby utilizing the available heat content of the reacted mixture to evaporate a corresponding quantity of benzene and water in the approximate composition of the benzene-water azeotrope, thereby forming a vaporous mixture consisting essentially of water, benzene and inerts at the top of the column, withdrawing the said vaporous mixture, and recirculating a portion of the said benzene-water mixture to the said catalyst chamber. This is further described in our issued patent U.S. 3,389,186.

The percentage of materials which can be returned as feed to the catalyst chamber in any reaction depends mainly upon the quantity of foreign materials which must be purged from that reaction's product stream. The foreign materials to be removed from the stream of the present reaction are mainly nitrogen when the oxygen-containing gas used is air, water which is introduced with the reactant hydrogen chloride, and small amounts of by-product carbon dioxide. The quantity of these foreign materials to be purged is so large that a direct recirculation of the reactants has up to now been impossible, for the reason that it would interfere with the necessary purging of the large quantities of foreign matter in the system, and thus lead to an unmanageable increase in purge products and an unacceptable dilution of the reactants.

According to the present invention, it was found that if the sensible heat of the reacted mixture issuing from the catalyst chamber is used to vaporize benzene and water in a ratio of approximately the benzene-water azeotropic composition having an atmospheric boiling point of about 65 degrees centigrade, then the composition of the vaporous mixture issuing from the top of that column is so improved that the recirculation of a substantial portion of it into the reaction can be permitted without incurring the disadvantages above mentioned. We have found that from about 5 percent to about 75 percent of the resultant vaporous mixture can be recirculated to the reaction zone. A more preferable operating range, however, is from about 10 percent to about 40 percent of the resultant vaporous mixture.

The improvement in the vapor mixture to be recycled is believed to be caused by two main factors; but we do not want to be limited to these theories, except as defined in the appended claims: (1) A considerable percentage of the water introduced into the reaction in the form of about 20 percent hydrochloric acid and formed in the reaction by the chlorination, together with the chlorinated benzenes, is eliminated at the bottom of the column. (2) The percentage of purge material in the vaporous mixture issuing from the top of the column is reduced by the addition to it of the benzene-water mixture having approximately the composition of the azeotrope which is vaporized in the column.

The result is that the concentration of the purge gases is sufficiently low to permit recycling of a portion of it into the reaction.

Referring to the figure, the following description is given to facilitate an understanding of the invention.

Benzene (liquid) in line 200 is vaporized in benzene vaporizer 201. The benzene vapors pass through line 203 to vapor mixer 206, where air from line 207 and hydrochloric acid from line 208 are mixed with the benzene. The mixed vapors then pass through line 210 into catalyst chamber 221. The catalyst chamber is divided into at least two catalytic zones. The resultant hot reaction gases pass through line 211 with substantially no cooling to distillation column 212, where water and benzene fed in through line 213 are used to condense out the chlorobenzenes. The liquid chlorobenzenes, benzene and water are withdrawn through line 220 for further processing. A portion of the vaporous overhead stream in line 214, consisting essentially of benzene, water and inerts, is withdrawn through line 215 for further processing.

In accordance with a preferred species of the present invention, the remaining portion of the vaporous mixture in line 214 is recirculated in line 218 to be employed as coolant to lower the temperature of the hot reaction gas stream as it passes from one catalytic reaction zone to the next adjacent zone, by direct re-injection into the system between the catalyst beds into the hot gas stream in the catalyst chamber 221.

Thus, in a preferred method according to the present invention, a complete reaction mixture consisting of a theoretical excess of benzene, the full quantity of hydrogen chloride and the full quantity of oxygen-containing gas is passed through a first zone having a bed of catalyst. The volume of the catalyst bed is limited so that at the operating temperature only about 15 to about 35 percent conversion of the reactant hydrogen chloride takes place. The partially reacted gases emerging from this first zone at an increased temperature are then cooled by the vaporous mixture of cooler materials consisting essentially of benzene, water and inerts being injected directly into the hot partially reacted gas stream emerging from the first catalytic zone in the space between the first and second zones. In other words, the reaction and the accompanying temperature increase in each catalytic zone is not controlled by the absence of reactants, such as air or hydrogen chloride, rather the reaction is controlled by the limited volume of catalyst. The reaction mixture issuing from the first bed of catalyst is cooled, not by the addition of a medium necessary for the reaction in the next catalytic zone, but by the addition of materials which are either inert to the reaction or which are already present in excess anyway, and in such amount and temperature as to bring the temperature down to the desired level.

The resulting cooled gaseous partially reacted mixture is then passed through a second zone having a bed of catalyst, the volume of which is again limited so that the reaction at the operating temperature of this bed is interrupted after it has gone a predetermined extent. Upon exiting from the second catalytic zone, the temperature of the hot reaction mixture is again lowered by the injection of more (lower-temperature) coolant. such as the vaporous materials consisting essentially of benzene, water and inerts. Another coolant which can be injected is benzene, whose boiling point is about 80 degrees centigrade, preferably in the form of an easily evaporated spray.

The number of beds, the temperature increase through each bed, and the temperature decrease after each bed can each be varied within wide limits and depend to a considerable extent upon the conditions of the reaction. To carry out the objects of this invention, the number of catalytic zones should be at least 2 in order to effect the desired degree of temperature control when a catalyst of the type disclosed in United States 1,963,761 is used. We prefer to use 4 catalytic beds each being of a volume which will give approximately the same conversion (temperature rise), as the other three beds. However, 5 or more beds may be used, especially where the desired conversion through the entire catalytic system is higher.

We have found that the temperature rise through each catalyst bed should be kept between about 20 and 60 degrees centigrade, in order to obtain optimum results. For each set of conditions such as proportion of reactants, catalyst activity and other factors, there is a certain optimum temperature at which the rate of reaction is at an economic optimum, while the rate of combustion to $CO_2$, etc., is still being maintained within an acceptable range. We have found it preferable to control by the choice of the initial temperature, the number of catalysts beds and the quantities of coolant injected between them, the range of temperature of the reaction mixture to within approximately 20 degrees centigrade above and below such optimum temperature. If, for instance, the optimum economic temperature were 220 degrees centigrade and the activiy of the catalyst such that a sufficiently rapid reaction is obtained at 200 centigrade, the quantity of catalyst in the first bed should be selected so that a temperature rise from sarting temperature of 200 degrees centigrade to approximately 240 degrees centigrade is obtained, whereupon the temperature of the vapors issuing from that catalytic zone is reduced by the injection of, for instance, the vaporous stream consisting essentially of inerts, benzene and water to 200 degrees centigrade prior to entry into the next adjacent catalytic zone. However, if the catalyst is slightly over active, slightly lower gas inlet temperatures should be used and if the catalyst bed has an activity below normal, a higher gas inlet temperature to the bed should be used. In any event, regardless of the catalyst activity, when using an overall conversion of about 12 percent and 4 catalyst zones, the temperature rise through the bed should be kept below about 100 degrees centigrade and preferably below about 50 degrees centigrade.

The amount of coolant to use in between each zone depends on the amount of cooling (i.e., temperature lowering) required to reduce the vapors to the desired temperature before entering the next adjacent catalyst zone, and the state and temperature of the coolant. We prefer to use fractions of the overhead materials coming from the oxychlorinator effluent distillation column or condenser produced in accordance with the teaching disclosed herein and in U.S. 3,389,186, because this vaporous stream is sufficiently cool (e.g., 65 degrees centigrade) and has a composition found to be uniquely suited for recirculating to the chlorinator without placing an undue burden on the purging system therefor.

In our preferred method of operation we convert per pass approximately 5 to 20 percent of the benzene to chlorinated benzenes. If, under certain conditions of operation, approximately 12 percent of the benzene were converted to chlorinated benzenes, the exothermic heat developed under these conditions would theoretically be sufficient to raise the temperature of the reaction mixture by approximately 170 degrees centigrade. If the initial temperature of the mixture were 200 degrees centigrade, the final temperature in an adiabatic reaction would be about 370 degrees centigrade. Actually this temperature is far above the operable range of temperatures, and cooling, (i.e., lowering of temperature), is necessary, in addition to the heat of reaction absorbed by the excess benzene, etc. We prefer not to permit the temperature to exceed 300 degrees centigrade. With these preferences we have found that 4 catalyst beds in series, each of which has a temperature rise of approximately 42.5 degrees, resulting in a maximum temperature inside of the reactor of about 242.5 degrees centigrade, gives optimum results. If the overall conversion per pass were much lower than 12 percent, with a proportionally lower theoretical increase in temperature, a smaller number of beds could be used, while, if a much higher overall conversion per pass were selected, we would prefer to use more than 4 catalysts beds in series. The preferred number of beds into which the total catalyst mass is to be split can approximately be calculated as the quotient of the total theoretical temperature rise, and the temperature rise in each bed limited by the permissible upper limit of the reaction temperature.

The actual amount of temperature lowering of the reation gas stream as it passes from one catalyst zone to the next adjacent catalyst zone, depends therefore on a number of variables, including the relative activity of each catalyst bed, and the degree of conversion desired. In general, when a 12 percent overall conversion is used and a four-bed catalytic zone, all beds of which are approximately of the same activity, then the preferred amount of temperature reduction between each catalyst bed is between about 15 and about 60 degrees centigrade. However, a substantial temperature lowering of from 2 to 5 degrees centigrade may be desired where the prior catalyst bed is relatively inactive or relatively low in temperature, or where both catalyst beds are relatively inactive. On the other hand, such as where both catalyst beds are quite active, or possibly where the previous catalyst bed is relatively high in temperature and the next adjacent bed is relatively inactive, a desirable substantial lowering of reaction gas stream temperature of as much as 100 degrees centigrade may be used to control the oxychlorination reaction, by injection of coolant directly into the reaction gas stream as it passes between each of said zones, in an amount sufficient to lower the temperature to the desired extent.

The amount of coolant used depends on the specific coolant used and its relative temperature and heat condition compared with the temperature and heat condition of the hot reaction gas stream. When liquid benzene is used, both its temperature rises below and above the boiling point (i.e., about 80 degrees centigrade), as well as its heat of vaporization may be used to lower the reaction gas temperature. When an approximate azeotropic mixture consisting essentially of vaporous benzene, water and inerts (i.e., boiling at about 65 degrees centigrade) is used, an even greater temperature differential may be utilized.

However, when using any coolants entering the catalytic zone at a temperature below the dew point of HCl and water (i.e., wet HCl), namely, about 120 degrees centigrade, great care should be taken to avoid periods when the materials of construction are at a temperature below about 120 degrees centigrade, and preferably about 130 degrees centigrade when corrosion could take place. Otherwise, special materials of construction, such as tantalum, which are very resistant to both wet HCl and high temperature oxidation and HCl should be used.

In any event, the coolant used must be injected at a temperature substantially lower than the reaction gas stream being cooled; that is, there must be a substantial lowering of temperature of the reatcion gas stream of at least 2 or 5 degrees centigrade and up to 100 degrees centigrade, with a lowering of between about 15 and about 60 degrees centigrade being normal.

Throughout this specification and claims the term "coolant" is used in its normal sense of an actual substantial lowering of temperature. The method of temperature control employed in the benzene oxychlorination prior art, namely to dilute the reactants with excess benzene, preheat the resultant mixture and use internal indirect cooling of the single catalyst bed absorbed the heat of reaction and prevented the temperature from going up excessively. But in that method at no time was the temperature of the reaction gas stream substantially lowered, i.e., cooled. Moreover, the prior art method of temperature control cannot give the improvements achieved by our method. In spite of these inviting superiorities of our method, it would not have been considered wise to employ it, because of the highly corrosive and unhealthy nature of this benzene oxychlorination process.

This method of keeping the temperature of the reaction mixture within the preferred limits combines in it the advantages of an internally cooled stationary bed, and those of a fluidized bed. It avoids the necessity of transporting the catalyst in fluidized form, the disintegration of the catalyst caused by it, the necessity of having devices for separating the solids from the gas stream and other shortcomings inherent in fluidized bed type catalytic reactors, yet our process retains the simple and close temperature control of a fluidized bed reactor. Further, it avoids the disadvantages of internal cooling surfaces, such as pipes or plates with cooling media surrounding them, and it avoids the chance of contamination of the process stream with the cooling medium through leaks at corroded areas of the heat transfer surfaces. Therefore, our process can be carried out in apparatus of simpler construction, which has less area for corrosion.

In addition, our method has been found to give improved yields of the desired products. Although we do not wish to be held to any theory, we believe that this is probably the result of one or more of several factors. One factor is that there is better temperature control afforded by the very efficient way of cooling the heated vapors, by means of the coolant being injected directly into them. Another factor arises from the known fact that the formation of undesirable higher chlorinated benzenes increases proportionally with the presence of chlorinated benzene, or, in other words, the conversion of the desired monochlorobenzene to the undesired higher chlorinated benzenes increases with increasing conversion. Thus, the unwanted concentration increase of undesired higher chlorinated benzenes is counteracted to a great extent by the injection of for instance the vaporous mixture consisting essentially of benzene, water and inerts for cooling purposes by reducing the ratio of hydrogen chloride to benzene.

Because of the careful temperature control required in the catalytic reaction zone, the reactants, hydrogen chloride, oxygen-containing gas and benzene are preheated to a temperature of between about 150 and 250 degrees centigrade prior to their entry into the zone. However, with respect to the coolant of benzene or vaporous mixture consisting essentially of benzene, water and inerts, this kind of preheating is not needed prior to injection into each of the spaces between the catalytic zones, and no subsequent additional cooling is needed to remove the heat later on. Thus, a saving in both initial investment and operating expense is also realized from this invention from this heat-saving factor alone.

In addition, the process of this invention can be carried out in simpler equipment than has been used heretofore. No complicated packed beds having internal cooling are required, and the equipment for introducing the coolant of benzene or vaporous mixture of cooling gases need only be of the type required for handling liquids or gases of normal operating pressures, distribution, etc.

From the above disclosure it is apparent that this invention can be carried out by different means. Our preferred methods of operating are embodied in the following examples; however, we do not wish to be limited thereto.

The following two numerical examples show a comparison. Example 1 shows the operation, wherein the sensible heat of the crude reactants is not utilized in accordance with our invention, while Example 2 shows a method according to this invention.

EXAMPLE 1

Benzene at the rate of 10,343 pounds per hour is vaporized and mixed with the vapors of 3169 pounds per hour of 17.3 percent hydrochloric acid, and then passed together with 1545 pounds per hour of air, at a temperature of about 200 to about 300 degrees centigrade, through a catalyst chamber in a process according to U.S.P. 1,963,761. Table I gives in column 1 the composition in pounds per hour of the gas-vapor mixture entering the reaction chamber, and in column 3 the composition of the reacted gas-vapor mixture coming out of the catalyst chamber having a temperature of approximately 300 degrees centigrade.

The product, namely 1400 pounds per hour of monochlorobenzene and 140 pounds per hour of dichlorobenzenes, can be isolated by the conventional methods such as condensation, distillation, etc. Thus, even if the products could be removed without condensing simultaneously any of the benzene, the percentage of material to be purged (e.g., water, nitrogen, and carbon dioxide), would amount to about 35 percent of the mixture, which is much too large for recycling from a practical standpoint.

TABLE I.—PROCESS OF EXAMPLE 1

| | Starting material vaporized, lb./hr. | Gas vapor chlorinator product, lb./hr. | Bottoms product composition, lb./hr. |
|---|---|---|---|
| Monochlorobenzene | | 1,400 | 1,400 |
| Dichlorobenzene | | 140 | 140 |
| Benzene | 10,343 | 9,274 | |
| HCl | 549 | 16 | |
| Water | 2,620 | 2,896 | |
| N$_2$ | 1,188 | 1,188 | |
| O$_2$ | 357 | 73 | |
| CO$_2$ | | 56 | |
| Others | | 14 | |
| Total | 15,057 | 15,057 | |

EXAMPLE 2

Process according to invention

In the process according to this invention, the total vaporized starting material entering the catalyst chamber as given in Table II, column 3, differs from that used in Example 1 only insofar as slightly more water (2948 pounds per hour instead of 2620 pounds per hour), slightly more nitrogen (1316 pounds per hour instead of 1188 pounds per hour), are present. The figures for the other starting materials namely the reactants, benzene, hydrogen chloride and oxygen, are identical with those in Example 1.

Likewise, the composition of the crude product mixture leaving the catalyst chamber corresponds identically with the figures shown in Table II, column 4, and Table I, column 2, except for the slightly larger water, nitrogen and carbon dioxide contents.

This reaction product mixture is fed into a distillation column operated at approximately atmospheric pressure to the top of which are fed the quantities of benzene and water shown in Table II, column 5. The available heat of the crude product vapor mixture entering the bottom of the column is thereby utilized essentially for the vaporization of the benzene-water azeotrope. We have found that the gas-vapor mixture issuing from the top of that column has approximately the composition given in Table II, column 6. Thus, the benzene content of this resultant vaporous mixture has been increased to 87.3 percent benzene in Table II. This enrichment in benzene content in any given case depends on the original composition of the reaction product mixture and its heat content, and it may increase the benzene content to values of from about 60 percent to about 90 percent, depending on these factors.

TABLE II.—PROCESS OF EXAMPLE 2

|  | Starting material vaporized, lb./hr. | Material recycled, lb./hr. | Total material into catalyst chamber, lb./hr. | Crude product into still, lb./hr. | Liquid into top of still, lb./hr. | Gaseous material leaving still, lb./hr. | Liquid material leaving col., lb./hr. | End product lb./hr |
| --- | --- | --- | --- | --- | --- | --- | --- | --- |
| Monochlorobenzene |  |  |  | 1,400 |  |  | 1,400 | 1,400 |
| Dichlorobenzene |  |  |  | 140 |  |  | 140 | 140 |
| Benzene | 6,755 | 3,588 | 10,343 | 9,274 | 19,314 | 26,888 | 1,700 |  |
| HCl | 549 |  | 549 | 16 |  |  | 16 |  |
| Water | 2,620 | 328 | 2,948 | 3,224 | 1,779 | 2,382 | 2,621 |  |
| N₂ | 1,140 | 176 | 1,316 | 1,316 |  | 1,316 |  |  |
| O₂ | 347 | 10 | 357 | 73 |  | 73 |  |  |
| CO₂ |  | 9 | 9 | 65 |  | 65 |  |  |
| Others |  |  |  | 14 |  |  | 14 |  |
| Total | 11,411 | 4,111 | 15,522 | 15,522 | 21,093 | 30,724 | 5,891 | 1,540 |

The material to be purged from the vaporous mixture leaving the top of the still (water, nitrogen and carbon dioxide), amounts to only 13.5 percent in this stream (as compared to about 35 percent in Example 1). A substantial portion of it therefore can be profitably recycled.

It is entirely feasible to supply all the benzene to be used in the reaction by recycling a portion of this stream. However, since normally some benzene vapor is available from the purification of the product, we prefer to supply only about one-half of the required benzene by recycling. In the present example as shown in Table II we recycle only about 13.4 percent of this gas stream, giving a recycle stream of the composition shown in column 3.

In order to reach the desired composition of the stream entering the catalyst chamber as given in column 3 of Table II, we vaporize the quantities shown in column 1, namely 3169 pounds per hour of 17.3 percent hydrogen chloride with 1487 pounds of air added to it, and we vaporize 6755 pounds per hour of benzene.

A comparison of these figures with those in Example 1 shows that we obtain essentially the same compositions of the reaction mixture and the same production by vaporizing only 6755 pounds per hour of benzene, as compared to 10,343 pounds per hour of benzene, in the conventional process.

In addition, we have found that owing to the slightly higher dilution with inerts (water 2948 pounds per hour, against 2620 pounds per hour, and nitrogen 1316 pounds per hour against 1188 pounds per hour), the combustion taking place in the catalyst chamber, as indicated by the production of carbon dioxide, would be actually somewhat lower, and the yield of product correspondingly higher in the process according to the present invention than in the conventional process.

Another of the main advantages of our process is the fact that the improved thermal economy of the process permits a lower conversion per pass, without undue increase in operating expense involved in the vaporization of benzene. This in turn results in a lowered simultaneous production of unwanted di- and more highly chlorinated benzenes.

Still another advantage is that smaller size equipment may be used to obtain the same results of the conventional process.

Although in the examples herein the distillation column is operated at approximately atmospheric pressure, pressures above or below this may also be used without departing from the scope of our invention.

EXAMPLE 3

Preferred method utilizing coolant of vaporous mixture comprising benzene, water and inerts A cylindrical catalyst chamber, six feet in diameter, contains four screens acting as supports for catalyst. Thirty-five cubic feet of catalyst prepared, for instance, according to Example 5 of U.S. Pat. No. 1,963,761, are distributed over the first screen, 45 cubic feet over the second, 70 cubic feet over the third, and 200 cubic feet over the last bed in the direction of the flow of the reaction mixture. Four packed catalytic zones A, B, C and D, each separated from the other by three open spaces, A–B, B–C and C–D, are formed thereby.

A reaction mixture comprising 549 pounds per hour of hydrogen chloride, 2520 pounds per hour of water, 6350 pounds per hour of benzene vapor, 1487 pounds per hour of air, and 43 pounds per hour of monochlorobenzene are preheated to 250 degrees centigrade, and passed continuously through the first catalyst bed in zone (A). The partly reacted mixture leaving the bed has a temperature of about 294 degrees centigrade.

The composition and temperature of the materials exiting from the first catalyst bed (A) is shown in column 2 of Table III. Approximately 2540 pounds per hour of a vaporous mixture having a temperature of about 67 degrees centigrade and a composition comprising 105 pounds per hour of nitrogen, 197 pounds per hour of water and 2220 pounds per hour of benzene, as well as small amounts of other materials already in the system, is injected directly into the materials exiting from the first catalyst bed as they enter space A–B between catalyst beds A and B. The temperature is thereby reduced to about 255 degrees centigrade. The composition of the vaporous materials used as the coolant in space A–B is shown in column one of Table IV. The vaporous coolant material having this type composition can be derived from another part of the overall system used in the continuous oxychlorination of benzene to monochlorobenzene. We have found that the overhead stream produced from the distillation of the product from this catalytic oxychlorination, as taught in Example 2, has a composition and temperature particularly suitable for use as the coolant herein. After passing through the second bed the reaction materials have again reached a temperature of about 291 degrees centigrade, which is again lowered to approximately 260 degrees centigrade this time by the injection into zone B–C of about 2364 pounds per hour of vaporous coolant having the composition shown in column two of Table IV. The procedure is repeated after the vapors pass through the third catalyst layer and the compositions are also shown in Tables III and IV. The vapors leave the fourth bed at about 296 degrees centigrade and contain about 1459 pounds per hour of monochlorobenzene, and about 140 pounds per hour of dichlorobenzene. These products are then recovered from the reaction gases. The temperature and composition of the materials as they pass through the catalyst chamber are summarized in Tables III and IV. In this Example 3 the conversion of benzene to chlorobenzene is about 10 percent.

TABLE III.—COMPOSITION AND TEMPERATURE OF STERAM PASSING THROUGH CATALYST CHAMBER IN EXAMPLE 3

| | A | | B | | C | | D | |
|---|---|---|---|---|---|---|---|---|
| | In | Out | In | Out | In | Out | In | Out |
| Pounds/hour: | | | | | | | | |
| $CO_2$ | 0 | 14 | 19 | 33 | 38 | 52 | 56 | 70 |
| $O_2$ | 347 | 271 | 278 | 205 | 211 | 142 | 147 | 81 |
| $N_2$ | 1,140 | 1,140 | 1,245 | 1,245 | 1,343 | 1,343 | 1,421 | 1,421 |
| HCl | 549 | 409 | 409 | 275 | 275 | 145 | 145 | 16 |
| $H_2O$ | 2,520 | 2,594 | 2,791 | 2,862 | 3,045 | 3,112 | 3,258 | 3,322 |
| $C_6H_6$ | 6,350 | 6,076 | 8,296 | 8,029 | 10,095 | 9,829 | 11,476 | 11,214 |
| $C_6H_5Cl$ | 43 | 393 | 399 | 749 | 755 | 1,105 | 1,109 | 1,459 |
| $C_6H_4Cl_2$ | 0 | 47 | 47 | 82 | 82 | 113 | 113 | 140 |
| $C_6H_3Cl_3$ | 0 | 5 | 5 | 9 | 9 | 12 | 12 | 14 |
| Temperature, °C | 250 | 294 | 255 | 291 | 260 | 291 | 269 | 296 |

TABLE IV.—COMPOSITION OF COOLANT VAPOROUS MIXTURES IN EXAMPLE 3

| | A–B, lb./hr. | B–C, lb./hr. | C–D, lb./hr. |
|---|---|---|---|
| $CO_2$ | 5 | 5 | 4 |
| $O_2$ | 7 | 6 | 5 |
| $N_2$ | 105 | 98 | 78 |
| $H_2O$ | 197 | 183 | 146 |
| $C_6H_6$ | 2,220 | 2,066 | 1,647 |
| $C_6H_5Cl$ | 6 | 6 | 4 |
| Total | 2,540 | 2,364 | 1,884 |

EXAMPLE 4

The process according to Example 3 was repeated except that in this case a more active catalyst was used which necessitated the use of lower operating temperatures, and a high conversion is obtained. Tables V and VI give the compositions and temperatures of the materials as in Tables III and IV of Example 3.

TABLE V.—COMPOSITION AND TEMPERATURES OF STREAM PASSING THROUGH CATALYST CHAMBER IN EXAMPLE 4

| | A | | B | | C | | D | |
|---|---|---|---|---|---|---|---|---|
| | In | Out | In | Out | In | Out | In | Out |
| Pounds/hour: | | | | | | | | |
| $CO_2$ | 0 | 28 | 43 | 71 | 82 | 110 | 118 | 146 |
| $O_2$ | 694 | 542 | 562 | 416 | 430 | 292 | 303 | 171 |
| $N_2$ | 2,280 | 2,280 | 2,604 | 2,604 | 2,839 | 2,839 | 3,022 | 3,022 |
| HCl | 1,098 | 818 | 818 | 550 | 550 | 290 | 290 | 32 |
| $H_2O$ | 5,040 | 5,188 | 5,749 | 5,891 | 6,299 | 6,433 | 6,750 | 6,878 |
| $C_6H_6$ | 6,350 | 5,802 | 12,117 | 11,583 | 16,173 | 15,641 | 19,213 | 18,689 |
| $C_6H_5Cl$ | 43 | 743 | 760 | 1,460 | 1,472 | 2,172 | 2,181 | 2,881 |
| $C_6H_4Cl_2$ | 0 | 94 | 94 | 188 | 188 | 250 | 250 | 304 |
| $C_6H_3Cl_3$ | 0 | 10 | 10 | 20 | 20 | 26 | 26 | 30 |
| Temperature, °C | 200 | 265 | 205 | 250 | 215 | 250 | 225 | 254 |

TABLE VI.—COMPOSITION OF COOLANT VAPOROUS MIXTURES IN EXAMPLE 4

| | A–B, lb./hr. | B–C, lb./hr. | C–D lb./hr., |
|---|---|---|---|
| $CO_2$ | 15 | 11 | 8 |
| $O_2$ | 20 | 14 | 11 |
| $N_2$ | 324 | 325 | 183 |
| $H_2O$ | 561 | 408 | 317 |
| $C_6H_6$ | 6,315 | 4,590 | 3,572 |
| $C_6H_5Cl$ | 17 | 12 | 9 |

Thus, by comparing Example 3 with Example 4, it can be seen that the rate of reaction in the individual catalyst beds is primarily controlled by the temperature at which the reaction mixture enters each bed. For instance, in Example 3, if, owing to an abnormally high catalyst activity or to other causes, the rate of reaction in the second bed were higher than desired and a temperature increase of 55 degrees centigrade, instead of 36 degrees, had resulted, while at the same time the rate of reaction in the fourth bed were found to be essentially lower, owing, for instance, to deterioration of the catalyst activity with age, and consequently an incomplete reaction had resulted, then the proper operation of the second catalyst chamber could be restored by injecting after the first bed, for example, additional amounts of coolant vaporous mixture, to bring the entrance temperature into the second bed to about 245 degrees centigrade, with the result that the discharge tempertaure of the reaction mixture issuing from the second bed would be reduced to 280 degrees centigrade, as desired, and by reducing somewhat the amount of vaporous mixture coolant to be added before the fourth bed, to give an entrance temperature into the fourth bed of about 273 degrees centigrade and thereby increasing the rate of reaction in this bed to its predetermined normal.

The preferred coolant to be used in the process of this invention can be defined as a vaporous mixture consisting essentially of benzene, water and inerts, the benzene content of which lies between about 60 percent and about 90 percent of the total, the water content of which is approximately that of the benzene-water azeotrope, and the balance is inerts, such as carbon dioxide and nitrogen. A typical and preferred vaporous mixture is that formed by the method exemplified above in Example 2, wherein the sensisble heat of the crude reacted gases from the catalytic chlorinator is utilized to vaporize an equivalent quantity of benzene and water into the said gases, while condensing out the monochlorobenzene therefrom.

EXAMPLE 5

Preferred method utilizing coolant of benzene

Into a catalyst chamber constructed as in Example 3, a reaction mixture comprising 550 pounds per hour of hydrogen chloride, 2950 pounds per hour of water, 6700 pounds per hour of benzene vapor and 1700 pounds per hour of air are preheated to 200 degrees centigrade, and passed continuously through the first catalyst bed in zone (A). The partly reacted mixture leaving the bed has a temperature of about 240 degrees centigrade. Approximately, 1220 pounds per hour of liquid benzene are injected in finely divided form directly into the partly reacted materials exiting from the first catalyst bed as they enter space A-B between catalytic zones (A) and (B), by means of spray nozzles positioned in the open space (A–B). The temperature is thereby reduced to about 200 degrees centigrade. After passing through the second bed in zone (B), the reaction mixture has again reached a temperature of about 240 degrees centigrade, which is again lowered to approximately 200 degrees centigrade this time by the injection of about 1220 pounds per hour of liquid benzene through spray nozzles positioned in the open space (B–C) between the second and third catalyst beds. The procedure is repeated after the vapors pass through the third catalyst layer (C). The vapors leave the fourth bed (D), at about 240 degrees centigrade and contain about 1400 pounds per hour of monochlorobenzene, and less than about 140 pounds per hour of dichlorobenzene. These products are then recovered from the reaction gases.

The rate of reaction in the individual catalyst beds is primarily controlled by the temperature at which the reaction mixture enters each bed. For instance, if, owing to an abnormally high catalyst activity or to other causes, the rate of reaction in the second bed were higher than desired and a temperature increase of 55 degrees centigrade, instead of 44 degrees, had resulted, while at the same time, the rate of reaction in the fourth bed were found to be essentially lower, owing, for instance, to deterioration of the catalyst activity with age, and consequently, an incomplete reaction had resulted, then the proper operations of the second catalyst chamber could be restored by injecting after the first bed, for example, 1370 pounds of benzene, bringing the entrance temperature into the second bed to about 195 degrees centigrade, with the result that the discharge temperature of the reaction mixture issuing from the second bed would be reduced to 240 degrees centigrade, as desired, and by adjusting the benzene spray before the fourth bed to about 1000 pounds per hour, resulting in an entrance temperature into the fourth bed of about 210 degrees centigrade, and thereby increasing the rate of reaction in this bed to its predetermind normal.

EXAMPLE 6

Into a catalyst chamber constructed as in Example 3, a reaction mixture comprising 550 pounds per hour of hydrogen chloride, 2950 pounds per hour of water, 6700 pounds per hour of benzene vapor and 1700 pounds per hour of air are passed continuously, after first preheating to 200 degrees centigrade, through the same catalyst of Example 5. After the first catalyst bed in zone (A), the partly reacted mixture emerging into zone (A–B) has a temperature of about 240 degrees centigrade. Approximately 4850 pounds per hour of benzene vapor at 80 degrees centigrade are added to this mixture, thereby reducing the temperature to about 200 degrees centigrade. After passing through the bed in the second zone (B), the reaction mixture has again reached a temperature of about 240 degrees centigrade, which is again lowered to approximately 200 degrees centigrade by the injection of about 4850 pounds per hour of benzene vapor at 80 degrees centigrade into the partly reacted materials entering zone (B–C). The procedure is repeated after the vapors pass through the third catalyst layer. The vapors leave the fourth bed at about 240 degrees centigrade and contain about 1400 pounds per hour of monochlorobenzene, and less than about 140 pounds per hour of dichlorobenzene. These products are then recovered from the reaction gases.

It is obvious that by this method of controlling the exothermic heat of the reaction, any desired temperature regime may be obtained. For instance, a gradual increase of the temperature level throughout the chamber, with bed temperatures adjusted to, for instance, 190 degrees to 230 degrees in the first catalytic zone, 200 degrees to 240 degrees in the second, 210 degrees to 250 degrees in the third, and 220 degrees to 260 degrees centigrade in the fourth, can be obtained. Or an adjustment of the process to the lower reaction rate in the later stages by permitting higher temperatures in the last bed, by controlling, for instance, to 180 degrees to 220 degrees in the first catalytic zone, 190 degrees to 220 degrees in the second, 200 degrees to 240 degrees in the third, and 220 degrees to 280 degrees centigrade in the fourth zone, resulting in a smaller catalyst volume at the possible expense of a slightly lower yield, can be obtained.

In a manner after Example 5, when a coolant of water is used as the coolant, instead of benzene, results similar to that achieved in Example 5 are realized by injecting into each of the spaces between the catalyst beds about 260 pounds per hour of water.

It is also to be understood that the coolant to be used to control the temperature of the reaction gases in accordance with the process of this invention is to be chosen from a number of chemicals compatible with the reaction system. As described above one suitable coolant consists essentially of benzene, in either the liquid or vaporous state. Or the coolant can be a vaporous mixture consisting essentially of benzene, water and inerts, such as that portion of the vaporous overheads of the chlorinator distillation column consisting essentially of benzene, water and nitrogen, formed and being recirculated in accordance with the above process. Another coolant consists essentially of water, in either the liquid, droplet or vaporous form. Another cooling medium is a vaporous mixture consisting essentially of water and inerts. Still another coolant consists essentially of benzene and inerts. Inert gases are also another coolant. Still other coolants may be used, alone or admixed with the above coolants. Where the catalyst bed is divided into at least three zones then one coolant can be used to cool the reaction gases emerging from the first zone, and another coolant used to cool the reaction gases emerging from the second zone, etc., or the same coolant can be used throughout. We prefer to use benzene or a vaporous mixture comprising benzene, water and inerts such as that reallizable from the overheads of the chlorinator effluent distillation column at each intermediate cooling zone, as set out above.

In U.S. 3,389,186, a specific method of recirculating the vaporous mixture from the oxychlorination condenser, consisting essentially of benzene, water and inerts, is claimed wherein between about 5 and about 75 percent, and preferably between about 10 and about 40 percent of the total vaporous mixture is split into a number of streams with one stream re-injected into the oxychlorination system with the benzene, hydrogen chloride and oxygen-containing gas, to be fed into the beginning of the catalytic reaction zone, preferably after being preheated to the desired reaction temperature. The generic concept of recirculating the said vaporous mixture in the stated percentages to the catalytic reaction zone is also claimed. In U.S. 3,389,186, however, the claims do not specify where the other split stream or streams are to be utilized. In the specification, it only suggests one use can be as coolant in the instant process where the catalyst has been divided into at least two packed catalytic zones. In U.S. 3,389,186, at least some of the oxychlorination condenser vaporous mixture which is recirculated is fed to the beginning of the oxychlorination process and this much of it is not used as coolant, i.e., to substantially lower the temperature of the reaction gases as claimed herein.

In the instant application, however, the coolant to be injected between the catalytic zone need not be derived from the vaporous mixture consisting essentially of benzene, water and inerts, recirculated from the benzene oxychlorination condenser, but can be selected from the group consisting of benzene, water, inerts and mixtures thereof, and can be derived from any source including the benzene oxychlorination condenser's vaporous effluent being recirculated.

Various modifications to this process can be made by one of ordinary skill in this art without departing from the scope of the invention.

We claim:

1. A continuous process for the production of monochlorobenzene which comprises: (1) passing hydrogen chloride, an oxygen-containing gas and benzene, said benzene being in excess of that theoretically required to react with all of the hydrogen chloride, through at least 2 packed catalytic zones in series, whereby in each of said zones only partial conversion of the reactants to monochlorobenzene occurs, (2) substantially lowering the temperature of the reaction gas stream as it passes from one catalytic zone to the next adjacent catalytic zone by introducing a vaporous mixture consisting essentially of benzene, water and inerts wherein the benzene content is between about 60 percent and about 90 percent of said vaporous mixture, and the water content is approximately that of a benzene-water azeotrope, directly into the reaction gas stream as it passes between each of said zones in an amount sufficient to lower the temperature of the reaction gas to the desired extent, and (3) recovering the monochlorobenzene from the reaction vapors from the final catalytic zone.

2. A continuous process for the production of monochlorbenzene which comprises: (1) passing hydrogen chloride, an oxygen-containing gas and benzene, said benzene being in excess of that theoretically required to react with all the hydrogen chloride, through at least 2 packed catalytic zones in series, whereby in each of said zones only partial conversion of the reactants to monochlorobenzene occurs, (2) passing the reaction vapors from the final catalytic zone into a condensation zone into which liquid benzene and water are being introduced, (3) withdrawing from said condensation zone a vaporous mixture consisting essentially of benzene, water and nitrogen wherein the benzene content is between about 60 percent and about 90 percet of said vaporous mixture, and the water content is approximately that of a benzene-water azeotrope, (4) substantially lowering the temperature of the reaction gas stream as it passes from one catalytic zone to the next adjacent catalytic zone by introducing said vaporous mixture from the condensation zone directly into the reaction gas stream as it passes between each of said zones in an amount between about 5 and about 75 weight percent of said vaporous mixture sufficient to lower the temperature of the reaction gas to the desired extent, and (5) recovering the monochlorobenzene from the condensation zone condensate.

3. A continuous process for the production of monochlorobenzene which comprises: (1) passing hydrogen chloride, an oxygen-containing gas and benzene, said benzene being in excess of that theoretically required to react with all of the hydrogen chloride, through 4 packed catalytic zones in series, whereby in each of said zones between about 15 to about 35 percent conversion of the reactant hydrogen chloride occurs and the temperature of the reaction gas stream increases less than about 100 degress centigrade, (2) substantially lowering the temperature of the reaction gas stream as it passes from one catalytic zone to the next adjacent catalytic zone by introducing a vaporous mixture consisting essentially of benzene, water and inerts wherein the benzene content is between about 60 percent and about 90 percent of said vaporous mixture, and the water content is approximately that of benzene-water azeotrope, directly into the reaction gas stream as it passes between each of said zones, in an amount sufficient to lower the temperature of the reaction gas to the desired extent, and (3) recovering the monochlorobenzene from the reaction vapors from the final catalytic zone.

4. A continuous process for the production of monochlorobenzene which comprises: (1) passing hydrogen chloride, air and benzene through a preheating zone to heat the materials to a temperature of between about 150 and about 250 degrees centigrade, said benzene being in excess of that theoretically required to react with all of the said hydrogen chloride, and then passing the preheated mixture throgh 4 packed catalytic zones in series, whereby in each of said zones between about 15 to about 35 percent of the reactant hydrogen chloride is converted and the temperature of the reaction gas stream increases below about 50 degrees centigrade, (2) substantially lowering the temperature of the reaction gas stream as it passes from one catalytic zone to the next adjacent catalytic zone by introducing a vaporous mixture consisting essentially of nitrogen, benzene and water wherein the benzene content is between about 60 percent and about 90 percent of said vaporous mixture, and the water content is approximately that of a benzene-water azeotrope, directly into the reaction gas stream as it passes between each of said zones, in an amount sufficient to lower the temperature of the reaction gas to the desired extent, and (3) recovering the monochlorobenzene from the reaction vapors from the fourth catalytic zone.

5. A continuous process for the production of monochlorobenzene which comprises: (1) passing hydrogen chloride, air and benzene through a preheating zone to heat the materials to a temperature of between about 150 and about 250 degrees centigrade, said benzene being in excess of that theoretically required to react with all of the said hydrogen chloride, (2) passing the preheated mixture through 4 packed catalytic zones in series, whereby in each of said zones between about 15 to about 35 percent of the reactant hydrogen chloride is converted and the temperature of the reaction gas stream increases below about 50 degrees centigrade, (3) passing the reaction vapors from the final catalytic zone into a condensation zone into which liquid benzene and water are being introduced, (4) withdrawing from said condensation zone a vaporous mixture consisting essentially of benzene, water and inerts wherein the benzene content is between about 60 percent and about 90 percent of said vaporous mixture, and the water content is approximately that of a benzene-water azeotrope, (5) substantially lowering the temperature of the reaction gas stream as it passes from one catalytic zone to the next adjacent catalytic zone by introducing said vaporous mixture from the condensation zone directly into the reaction gas stream as it passes between each of said zones in an amount between about 5 and about 75 weight percent of said vaporous mixture sufficient to lower the temperature of the reaction gas to the desired extent, and (6) recovering the monochlorozene from the condensation zone condensate.

6. A continuous process for the production of monochlorobenzene which comprises: (1) passing hydrogen chloride, an oxygen-containing gas and benzene, said benzene being in excess of that theoretically required to react with all of the hydrogen chloride; through at least 3 packed catalytic zones in series, whereby in each of said zones only partial conversion of the reactants to monochlorobenzene occurs, (2) substantially lowering the temperature of the reaction gas stream as it passes from one catalytic zone to the next adjacent catalytic zone by injecting coolant consisting essentially of benzene, water, and inerts wherein the benzene content is between about 60 percent and about 90 percent of said vaporous mixture, and the water content is approximately that of a benzene-water azeotrope, directly into the reaction gas stream as it passes between each of said zones in an amount sufficient to lower the temperature of the reaction gas to the desired extent, and (3) recovering the monochlorobenzene from the reaction vapors from the final catalytic zone.

References Cited
UNITED STATES PATENTS

| | | | |
|---|---|---|---|
| 1,963,761 | 6/1934 | Prahl | 260—650 UX |
| 2,216,988 | 8/1938 | Engelstein | 208—81 |
| 2,166,829 | 7/1939 | Swartwood | 208—81 |
| 3,303,223 | 2/1967 | Kelly | 260—650 X |
| 3,389,186 | 6/1968 | Prahl et al. | 260—650 |

FOREIGN PATENTS

| | | | |
|---|---|---|---|
| 517,009 | 9/1955 | Canada | 260—650 |

OTHER REFERENCES

Hougen et al.: Chemical Process Principles, Part 3, Kinetics and Catalysis, John Wiley and Sons, New York (1947), pp. 1031–1033.

HOWARD T. MARS, Primary Examiner